April 4, 1972 — W. C. TOEDTER — 3,654,053
DECORATIVE PANEL, PLATE, BOARD OR THE LIKE AND
METHOD OF FABRICATING SAME
Filed Nov. 18, 1969 — 4 Sheets-Sheet 1
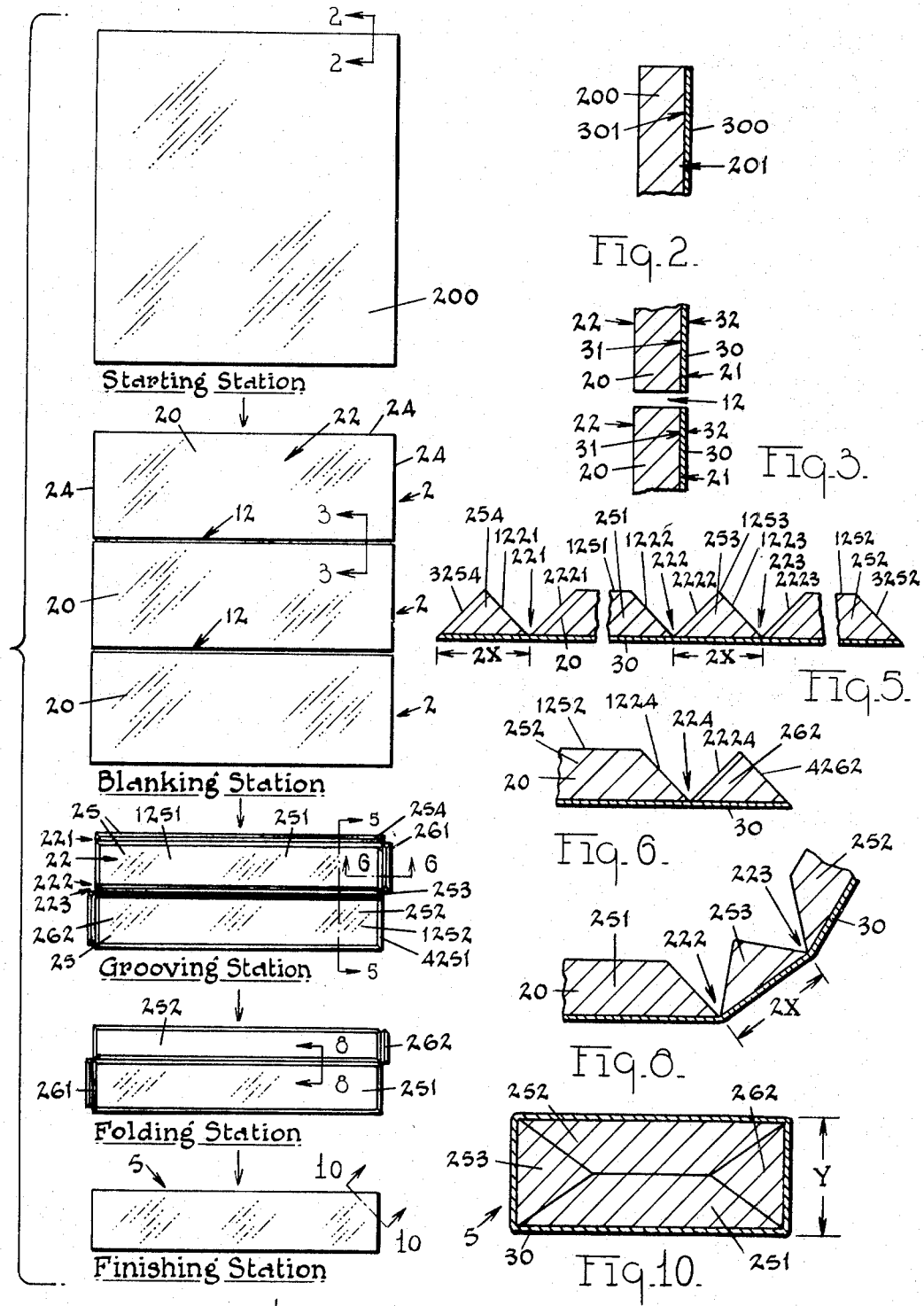

April 4, 1972     W. C. TOEDTER     3,654,053
DECORATIVE PANEL, PLATE, BOARD OR THE LIKE AND
METHOD OF FABRICATING SAME
Filed Nov. 18, 1969     4 Sheets-Sheet 2
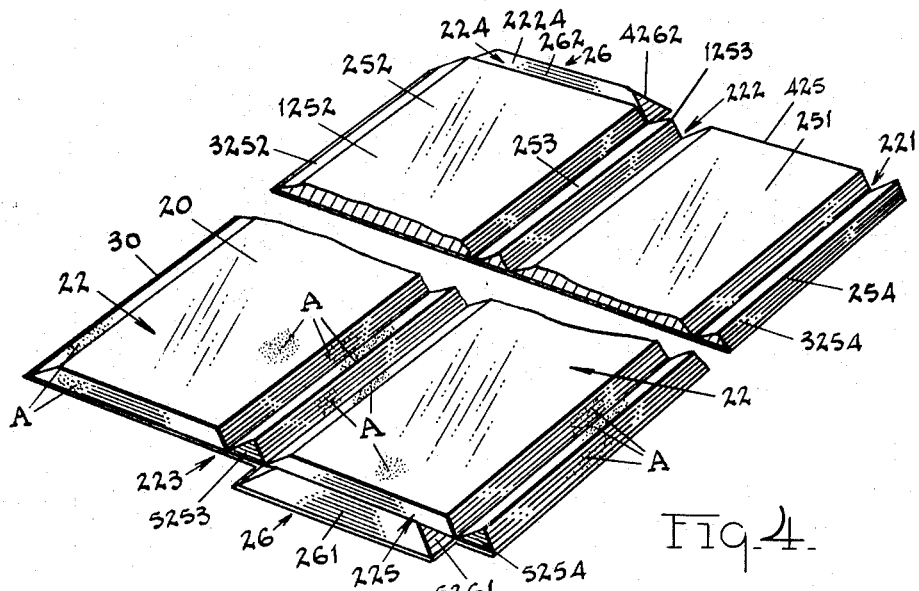
Fig. 4.
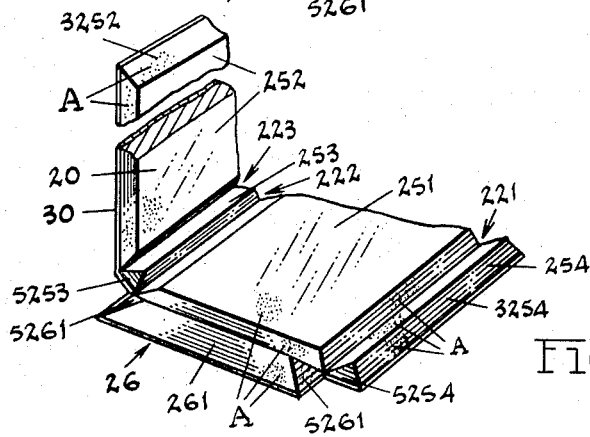
Fig. 7.
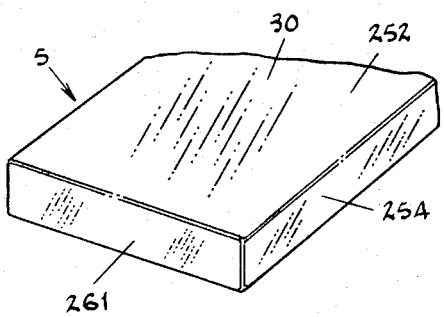
Fig. 9.
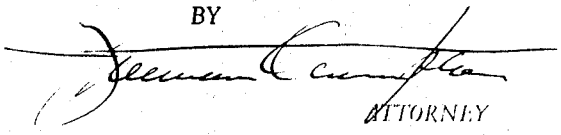
INVENTOR.
William C. Toedter
BY
ATTORNEY April 4, 1972 W. C. TOEDTER 3,654,053
DECORATIVE PANEL, PLATE, BOARD OR THE LIKE AND
METHOD OF FABRICATING SAME
Filed Nov. 18, 1969 4 Sheets-Sheet 4

INVENTOR.
William C. Toedter
BY
ATTORNEY

United States Patent Office 3,654,053
Patented Apr. 4, 1972

---

3,654,053
DECORATIVE PANEL, PLATE, BOARD OR THE LIKE AND METHOD OF FABRICATING SAME
William C. Toedter, Toledo, Ohio, assignor to Re-Flect-O-Lite Corporation, Toledo, Ohio
Filed Nov. 19, 1969, Ser. No. 877,812
Int. Cl. B32b 3/04, 3/10, 3/22
U.S. Cl. 161—43
6 Claims

ABSTRACT OF THE DISCLOSURE

An article comprising an unfinished, but film clad, flat, relatively inexpensive blank, scored, folded and adhesively secured to synthesize a finished decorative panel, plate, board or the like having the appearance of relatively expensive material or finish and a method of fabricating such article and that at various thicknesses, notwithstanding the thickness dimension of the clad blank from which the panel is constructed. As used herein in the hereto appended claims, the words "panel, plate, board or the like" shall be each understood to refer to a smooth, generally flat, relatively thin, internally integrated body extending laterally to dimensions greatly in excess of the dimensions of its axial extension and presenting, superficies, a pair of major and opposite parallel faces of like dimensions and outline spaced from each other and adjoined by intermediate edge and often end surfaces.

BACKGROUND OF THE INVENTION (1) Field of the invention

Furniture and building accessory structures, wherein appearance and economy are of primary importance.

(2) Description of the prior art

The use of clad light gauge blank to construct a composite building structure of a more bulky nature having desired non-conductive properties has been taught. For example, in the U.S. Pat. No. 2,557,412 to Clements, the making of an insulated door, so constructed, is shown. In addition, the adaptation of a clad and inexpensive blank to simulate a building structure of a more prized and usually expensive material has been taught. Typical of this are the beam structure shown in the U.S. Pat. No. 3,277,624 to Cornell.

As yet, however, no one has taught the construction of a decorative panel, plate, board or the like from a clad blank in which all faces, edges and ends of the completed article present the cladding to the exterior and impart a entirely completely finished element. Also no teaching is found in the art by which a workpiece from which blanks are taken may be composited with cladding film, at one place, such as a place of low material and labor costs, shipped at low bulk rate, in large sheets, to a cutting, grooving or scoring and folding plant to be there finished for the use in a more local market.

Still further there is no teaching in the art by which the finished element is truly structurally integrated, through intercontact of its several parts and surfaces and thus in all directions about the center of mass or displacement of the finished element. Hence, weight for weight, the finished element resulting from the use of my invention and embodying the features thereof has greater resistance to crush and shear exerting forces.

SUMMARY OF THE INVENTION

The invention, relating to an article usable as a decorative panel, plate, board or the like, contemplates the improvement which comprises a single sheet blank having an integumentary lamina in cladding relation to one surface of such blank, the blank being grooved to divide it into strips of leaves and flaps, hingedly connected by uncut areas of the lamina and foldable upon each other into engagement with each other, to be secured by adhesive, with the lamina exterior to the thus folded and registering leaves and flaps to impart a finished appearance to the composite thereof.

BRIEF DESCRIPTION OF DRAWINGS

In the accompanying drawings:

FIG. 1 illustrates, diagrammatically, a flow sheet of the various stations, identified as such, at which operations, to be hereinafter described, are performed, and to produce the article of the invention;

FIG. 2 illustrates a view of an enlarged section taken along the plane of the 2—2 indicated in FIG. 1;

FIG. 3 illustrates a view of an enlarged section taken along the plane of the line 3—3 in FIG. 1;

FIG. 4 is a perspective view of the preferred form of the blank, following grooving at the "Grooving Station," shown in FIG. 1, the blank being fragmented to facilitate the showing;

FIG. 5 illustrates a view of an enlarged section taken along the plane of the line 2—2 indicated in FIG. 1;

FIG. 6 illustrates a view of an enlarged section taken along the plane of the line 6—6 indicated in FIG. 1;

FIG. 7 is a perspective view of one end of the blank shown in FIG. 4 in the course of being folded at the "Folding Station" indicated in FIG. 1;

FIG. 8 illustrates a view of an enlarged section taken along the plane of the line 8—8 indicated on FIG. 1;

FIG. 9 is a perspective view of one end of the completed decorative panel, plate, board or the like at the "Finishing Station" indicated in FIG. 1, produced from the blank shown in FIGS. 4 and 7 and in consequence of passing through the operations at the several stations marked in FIG. 1;

FIG. 10 illustrates a view of an enlarged section taken along the plane of the line 10—10 indicated on FIG. 1;

DESCRIPTION OF PREFERRED EMBODIMENT

Figure 11:
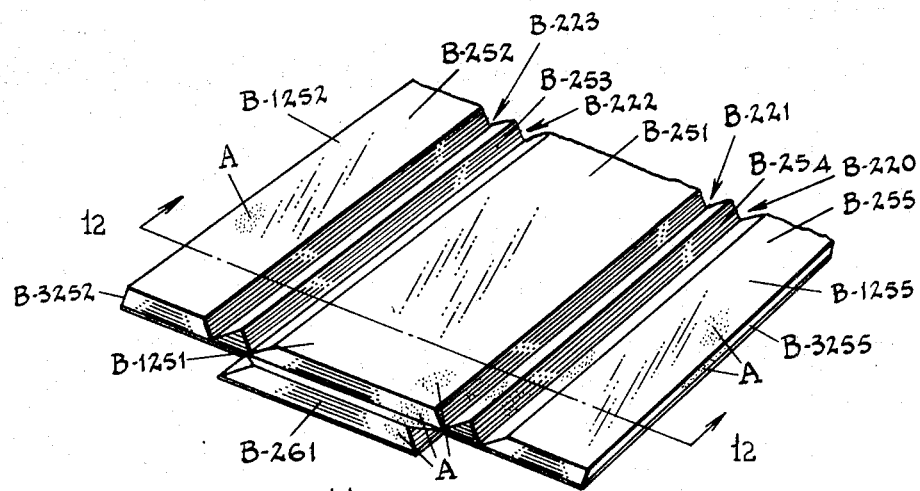
FIG. 11 is a perspective view of one end of a modified form of my invention and being shown at the "Grooving Station" aforementioned.

An article embodying the features of my invention comprises a laminated sheet blank, such as shown at 2 in FIG. 1 of the accompanying drawings, grooved, folded and secured, thereby forming a decorative panel, plate, board or the like, such as shown at 5 in FIG. 9 of the accompanying drawings.

The blank 2 is a laminate of a substantially rigid backing sheet 20 of fibre or composition board, plywood or the like and an otherwise flexible polymer film 30 of vinyl, sheet plastic or some like membranous material. The sheet 20 may be of any thickness standard in structural material of this kind, ranging upwardly usually from one-eighth inch thickness to that of an inch or so. The film 30 is of the conventional thickness of two to eight thousands of an inch and is in integumental relation to one of the major lateral surfaces of the sheet 20. In this relation, the entire area of a major lateral surface 31 of the film 30 is affixed, as by an adhesive, to the entire area of one major lateral surface, such as the surface 21, of the sheet 20.

In a very real sense, therefore, the film 30 is dermal to the sheet 20 and may impart a finished appearance to one side thereof. Thus, if the film 30 or its exposed surface 32 has an inherent texture or color, the sheet 20 will be made to have an appearance of other than its true one. For example, surface 32 may, by coloring, be made to look like wood graining, high gloss enameling and such or, by texturing, be made to look like linen, mortar work and such. The potential of thus creating a variety of appearances becomes a valuable adjunct in the use of embodiments of my invention in designing and constructing furniture, living quarters and the like.

To serve the interests of economy, the blank 2 may be one of several sectional parts of a larger work sheet, such as the work sheet 200. In such instances, the work sheet 200 is prepared in a roughing mill. There, also a large sheet of film 300, having the desired inherent or surface characteristics of the kind mentioned, may be applied so as to locate one of its major lateral surfaces 301 in engagement with the working sheet 200 over the entire area of one of its major lateral surfaces, such as surface 201 thereof. From the mill, the work sheet 200, so clad by the film 300, may be brought to and temporarily deposited at a "Starting Station," indicated as such in FIG. 1 of the accompanying drawings, and at which the process of synthesizing the panel 5 begins. From the Starting Station the sheet 200 is moved to a "Blanking Station," also indicated in FIG. 1. Here the work sheet 200 and its cladding film 300 may be cut, along lines 12, to form the blank 2 and other thereto corresponding blanks.

The blank 2 is now moved from the Blanking Station to a "Grooving Station," so indicated diagrammatically in FIG. 1 of the accompanying drawings. At the Grooving Station, apparatus, such as that shown in United States Letters Patent No. 3,322,171 to Richard R. Cornell may be arranged. Such apparatus, through the medium of rotary driven cutters passed over the backing sheet 20 of the laminate blank 2 will chamfer a groove therein, without breaching the laminal film 30 thereon. To that end, therefore, the blank 2 is disposed at the Grooving Station to present the unclad major lateral surface 22 thereof to the cutting action of such apparatus operated, either individually or as battery, to cut (see FIG. 5 of accompanying drawing) a plurality of grooves 221, 222 and 223 into the backing sheet 20. The grooves thus formed open inwardly of the sheet surface 22 to a depth substantially equal to, but no more than, the thickness of the sheet 20. The grooves also extend lineally from one to an opposite of the blank perimetric edges 24 along spaced straight lines, parallel to each other and a major axis of the sheet. The grooves divide the sheet 20, when viewed as in FIG. 4 of the drawings, into strips or leaves 25 of which a pair 251 and 252 are spaced and joined by strip 253 therebetween. Strip 254 of the strips 25 appends, as a flap, from an edge of one of the pair of strips, such as the strip 251. The strips 253 and 254 each have, when viewed as in FIG. 5 of the accompanying drawings, a substantially similar and triangular cross-section and the strips 251 and 252 each have, when so viewed, a substantially similar and trapezoidal cross-section.

The spacing of the grooves 221, 222 and 223 is critical. The groove 222 must be laterally spaced from groove 223 a distance that the root lines of such grooves are spaced a distance from each other equal to no less than twice the thickness of the blank 2 and no greater than some desired thickness of the resultant panel 5. This can be expressed by a formula as follows:

$$Z = 2X \text{ plus } (Y \text{ minus } 2X)$$

wherein "Z" equals the critical distance between the root lines grooves 222 and 223 and "X" is the thickness of the blank 2 and "Y" is the desired thickness of panel 5. The preferred form is one in which the desired thickness (Y) of panel 5 is equal to twice the thickness (X) of the blank 2. Thus, in FIGS. 5 and 10 of the accompanying drawings, I have indicated application of the formula symbols.

Each groove has a pair of flat chamfered surfaces extending in planes parallel to the lineal axis of the groove and in an angular relation to each other of approximately ninety degrees. Thus, the groove 221 that delineates strip 251 from strip 254 has, when cut, a pair of flat chamfered surfaces 1221 and 2221 that extend the entire length of the groove 221, each in a plane at a chamfering angle of forty-five degrees to the plane of surface 1251 of the strip 251 and at an angle of ninety degrees to the other chamfered surface.

The groove 222, which delineates the strip 251 from the strip 253 has, likewise, when cut, a pair of flat chamfered surfaces 1222 and 2222 that extend the entire length of the groove 222, each in a plane at a chamfering angle of forty-five degrees to the plane surface 1251 of the strip 251 and at an angle of ninety degrees to the other chamfered surface.

So also the groove 223, delineating strip 253 from strip 252, has, when cut, a pair of flat chamfered surfaces 1223 and 2223 extending the entire length of the groove 223, each flat surface being in a plane at a chamfering angle of forty-five degrees to the plane surface 1252 of strip 252 and at an angle of ninety degrees to the other chamfered surface. It will be noted that chamfered surfaces 2222 and 1223 that define the strip 253 converge and, in the preferred embodiment, intersect along a line 1253 in plane with the surfaces 1251 and 1252 of the strips 251 and 252.

By this arrangement, the strips 251 and 252 may be moved, as shown in FIG. 7 of the accompanying drawings, like book leaves, angularly with respect to each other and about the strip 253, that serves as a spine or post section for such movement, and upon hinges provided by the film 30 at the roots of the grooves 222 and 223. In such movement, the polymer film 30 will be twice folded, each fold being a right angular one and extending along a line parallel to the line of fold of the other fold. Also the grooves 222 and 223 will be closed and their respective chamfered surfaces 1222 and 2222 and 1223 and 2223 brought to interengagement or surface to surface contact. Also, the strip 251 will have been brought into a plane parallel with the plane of leaf 252 that their respective surfaces 1251 and 1252 face each other and, in the preferred form of my invention, are also in surface to surface contact. When such movement is complete, strip 253 will extend between and at right angles to the registering strips 251 and 252, imparting the effect of side edge to the composited strips 251 and 252.

I contemplate that some suitable adhesive A may be located between interengaging surfaces 1222 and 2222 and between likewise interengaging surfaces 1223 and 2223. Allowed to set, the adhesive will secure these surfaces together. The strips or leaves 251 and 252 will be thus restrained from movement relative to each other and to the strip 253. In the preferred form, adhesive A may also be applied to the surface 1251 and 1252 of the strips, either in lieu of application to the grove surfaces or in addition thereto.

It will now be seen that the described assembly will, by virtue of the color or texture of the film 30 attached to the strips 251, 252 and 253, have the appearance of a semi-finished panel 5, plate, board or the like, of which only one of its longer side edges and its two opposite ends are unfinished. In order to impart such finished appearance to such side edge of panel 5, the strip 254 is moved angularly upon the hinge provided by the film 30 at the root of the groove 221. Such movement imparts a third right angle fold to the polymer film 30 along a line parallel to the two previously mentioned folds. In addition, the movement closes the groove 221 and is preferably continued until the chamfered surface 1221 and 2221 of groove 221 engage. Upon such engagement, the strip 254 will extend between and at right angles to strips 251 and 252, along the theretofore unfinished side edge of the panel 5, plate, board and the like. Adhesive A applied to the groove surfaces 1221 and 2221 and allowed to set will secure the strip 254 against movement from between strips 251 and 252.

So as not to occlude the mating of the free edge of strip 254 with the free edge of leaf 252, such edges are chamfered to provide a flat surface 3254 on the free edge of strip 254 and a flat surface 3252 on the free edge of leaf 252. When the strip 254 has been moved relative to strips 251 and 252, as earlier herein described, the surfaces 3252 and 3254 will face and approximate each other, in surface to surface contact. Adhesive A applied therebetween and allowed to set will seal the mentioned surfaces together and impart a finished appearance to the heretofore mentioned unfinished side edge of panel 5. The finished panel, when viewed transverse the three folds in the polymer film or as in FIG. 9 of the accompanying drawings, will be substantially rectangular in cross section.

Should it be desired that the end edges of the panel 5 appear to be finished, as I contemplate they should be, thus to impart a complete finish to all faces, sides and ends of the panel 5, end strips or flaps 26 are provided to append from opposite ends of one or both strips 251 and 252. The flaps 26 are formed by grooves chamfered in the surface 22 of one or both strips at the time the blank 2 is at the Grooving Station receiving the grooves 221, 222 and 223. In the form shown in the drawings, an end strip or flap 261 shown in FIG. 7 of the drawings is provided at one end of strip 251 and another end strip or flap 262, shown in FIG. 6 of the drawings, is provided at the opposite end of the strip 252.

To delineate, the strip flap 262 on strip 252, a groove 224, see FIG. 6, is cut into that portion of the backing sheet 20 of the strip 252 and inwardly from the unclad leaf surface 1252 to a depth substantially equal to the thickness of the backing sheet 20 and short of intersecting the film 30 attached thereto. The groove 224 extends lineally, at right angles to the direction of extension of grooves 222 and 223 and from a point on the perimeter 24 at which the grooves 222 and 223 intersect the mentioned perimeter. The groove 224, like grooves 222 and 223, has a pair of flat chamfered surfaces 1224 and 2224 extending in planes parallel to the lineal axis of the groove 224 and at an angular relation to each other of ninety degrees. This will allow the strip flap 262 to be moved angularly upon a hinge provided by the film 30 along lineal root of the groove 224. Such movement closes the groove and continues until the chamfered surfaces 1224 and 2224 of the groove 224 engage, in surface to surface contact. Upon such engagement, the strip 262 will extend between and be at right angles to strips 251 and 252, along the theretofore unfinished end edge of the panel 5. Adhesive, such as A, may be applied to the groove surfaces 1224 and 2224 which, when set, will secure the strip flap 262 against movement from between the strips 251 and 252.

To allow mating of the strip flap 262 with the end of strip 251 when the strip flap 262 is moved as just described, the free edge of strip flap 262 and an end edge of the strip 251 are chamfered to provide flat surfaces 4262 and 4251, respectively. Thus, when the strip flap 262 has been moved relative to the strips 251 and 252, the flat surfaces 4262 and 4251 will face and approximate each other and be in surface to surface contact. By an application of the adhesive A to such surfaces and allowance of the same to set, the strip flap 262 will be secured.

To eliminate occlusion between the ends of the strip flaps 261 and 262 and the ends of strips 253 and 254, such ends are chamfered, see FIGS. 4 and 7 of the accompanying drawings, to provide flat surfaces that mate when the flaps are moved to cover and close the end edges of strips 251 and 252. For example, the strip flap 261 has opposite end chamfered flat surfaces 5261 and strips 253 and 254 each have opposite end chamfered surfaces 5253 and 5254. When, the the strip flap 261 is moved, as described, to close the delineating groove 224 thereof, the surfaces 5261 will mate with surfaces 5253 and 5254 at one end of the leaves 253 and 254. With adhesive A between such surfaces, the end of the panel 5 will exhibit an entirely finished appearance at that end.

In order to impart such finished appearance to the other end of the panel 5, the end strip flap 261 (see FIG. 4 of the drawings) and its delineating groove 225 in strip 251 may have corresponding chamfered surfaces to those described with reference to end strip flap 261. Such chamfered surfaces on end strip flap 262 coact with corresponding chamfered surfaces at the other end of strips 251, 252, 253 and 254 to allow sealing of the end strip flap 262 over the ends of such strips and thus to complete the finished appearance of panel 5. It would not seem necessary, for the edification of those skilled in the art, to duplicate the description of the provisions on end strip flap 262 of all the described surfaces and the relation of the same exhibited by the end strip flap 261.

DESCRIPTION OF MODIFIED EMBODIMENTS

Figure 12:
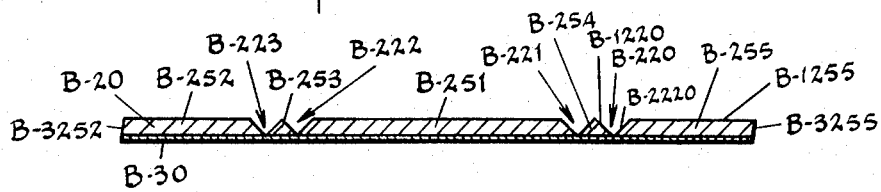
FIG. 12 illustrates a view of an enlarged section taken along the plane of the line 12—12 indicated on FIG. 11.
Figure 13:
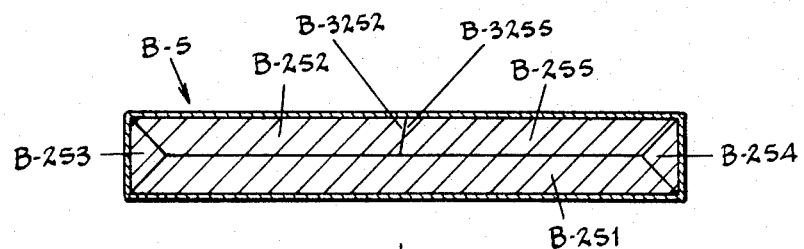
FIG. 13 illustrates a view of a transverse section of the form shown in FIGS. 11 and 12 when the same has been folded and secured to complete a panel.

FIGS. 11, 12 and 13 of the accompanying drawings show a modified form of my invention. In the main, the modified form there shown varies from the preferred form by having a strip B–252 not as wide as strip 252 of the preferred form and a fifth leaf B–255. The fifth strip B–255, in effect, supplements the lesser extension of the not-so-wide strip B–252.

The fifth strip B–255 is delineated by a groove B–220 that may be cut into backing sheet B–20 in spaced parallel relation to the groove B–221 thereby substituting for the chamfered surface 3254 of strip 254 and establishing the width of the fourth leaf B–254.

Like grooves B–221, B–222 and B–223, groove B–220 is cut at the Grooving Station to have a pair of flat chamfered surfaces B–1220 and B–2220 that extend in planes parallel to the lineal axis of the groove B–220. One chamfered surface B–1220 extends in a plane at right angles to the plane of the other chamfered surface B–2220. Each chamfered surface extends also in planes that are at angles forty-five degrees to surface B–1255 of the leaf B–255.

The depth of the groove B–220, like that of grooves B–221, B–222 and B–223 is equal to that of the thickness of the backing sheet B–20, leaving the laminate B–30 at the root of the groove B–220 intact. This provides a hinge that supports strip B–255 for movement about the edge of strip B–254 and like a lid of a box, into registration within an overlay relation to strip B–252.

But for the provision of chamfered meeting free edge surfaces B–3252 and 3255 on the strips B–252 and B–255, the modified structure otherwise has the same end strip flaps, such as end strip flaps B–261, and the related and mating surfaces described in connection with the preferred form of my invention. To show such correspondence, I have used the same legends in FIGS. 11 to 13 of the drawings as those used in FIGS. 2 to 10 inclusive thereof, prefixed, however, with the letter "B."

When the strips and strip flaps are closed, as they are shown in FIG. 13, the surfaces B–3252 and B–3255 will be in such intimate contact that adhesive A will seal and thus complete a finished appearing panel B–5, plate, board or the like.

Figure 14:
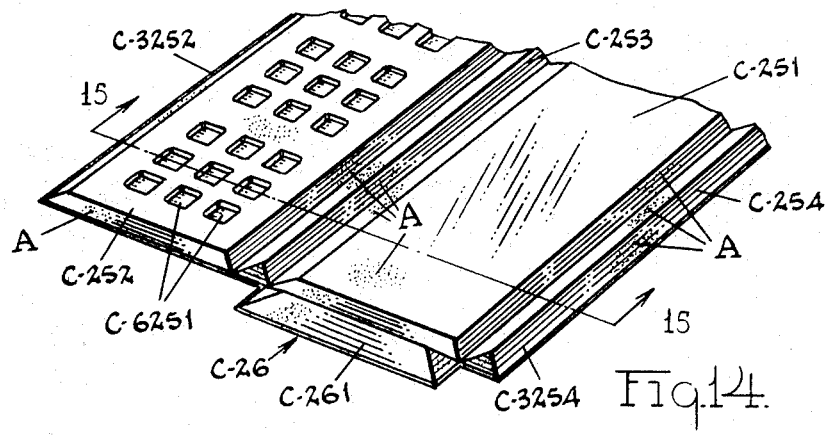
FIG. 14 is a perspective view of one end of a further modified form of my invention.
Figure 15:
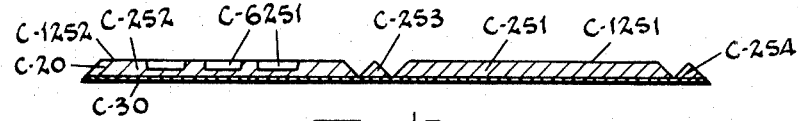
FIG. 15 illustrates a view of a section taken along the plane of the line 15—15 indicated in FIG. 14.

FIGS. 14 and 15 of the drawings show another modification of my invention. Here a strip, such as leaf C–251, is cored, portions thereof having been removed to provide when strip C–252 is closed upon strip C–251, closed chambers C–6251. Such chambers may be left empty or made to contain sound, heat or similar insulating materials to serve the advantages of lessened weight, thermal resistance and the like. In all other respects, however, the modified form shown in FIGS. 14 and 15 substantially duplicates preferred form. Accordingly, I have used the same legend numerals used in FIGS. 2 to 10 to designate like parts of the form shown in FIGS. 14 and 15, prefixed, however, by the letter "C."

Figure 16:
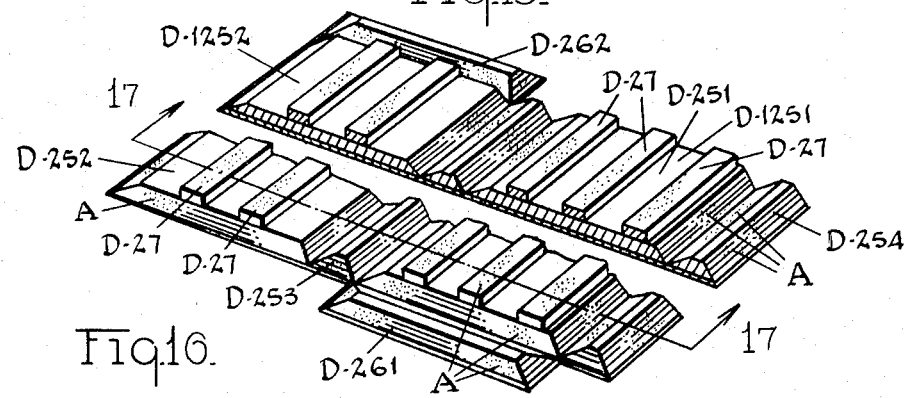
FIG. 16 is a perspective view of one end of a still further modified form of my invention.
Figure 17:
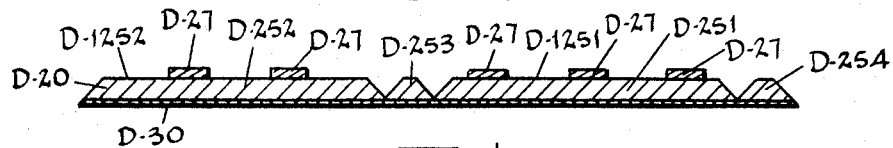
FIG. 17 illustrates a view of a section taken along the plane of the line 17—17 indicated on FIG. 16.
Figure 18:
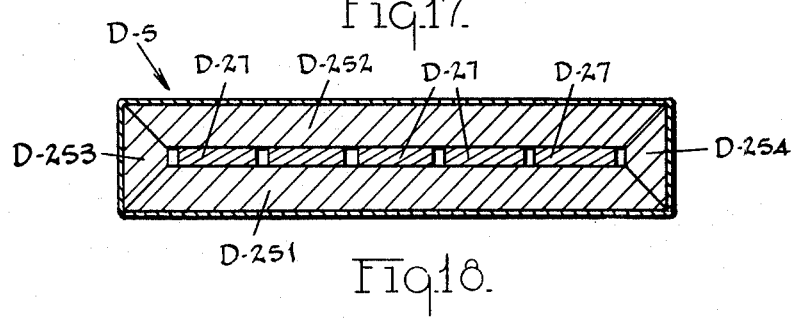
FIG. 18 illustrates a view of a longitudinal section of a completed panel constructed by the structure of the modified form shown in FIGS. 16 and 17.

FIGS. 16, 17 and 18 show a still further modification of my invention. Here the problem of producing a panel 5 of a thickness greater than the combined thicknesses of the strips 251 and 252 is engaged. The formula by which the strip delineating grooves are spaced has already been discussed. The structure shown here assumes that a panel D–5 of a thickness greater than the combined thicknesses of the strips D–251 and D–252 is desired. This will be accomplished by widening strips D–253 and D–254 and spacing the strips D–251 and D–252 a distance equal to the desired thickness of the panel D–5, when the panel, by the folding of the strips and strip flaps, is completed.

To obtain greater integration in such a structure, spacer pieces D–27 that may be affixed to and project from the lateral surfaces D–1251 and D–1252 of one or both strips D–251 and D–252 are provided. As will be seen from the drawings, when the strips D–251 and D–252 are located in registry with each other, the pieces D–27 on one strip engage the mentioned lateral surfaces of the other strip. The engagement of the pieces D–27 with the leaves will hold the strips in a spaced relation equal and the overall thickness of the resulting panel D–5 will be the desired one. This also presupposes of course, that end strip flaps D–261 and D–262 along with strips D–253 and D–254 will be wider than the thereto corresponding strips and end strips flaps of the preferred form. The use of adhesive A in this modification will be the same as in the preferred structure, except that the major lateral surfaces D–251 and D–1252 of the strips D–251 and D–252 will not be in contact throughout and thus be adaptable to adhesive interaction. Securement in these areas will be limited to contact of the pieces D–27 with such surfaces.

Thus, in its various froms and embodiments, my inventions teach a structure by which a decorative panel, plate, board or like having the appearance of being expensively finished on all faces, edges and ends may be presented, utilizing relatively inexpensive materials and machine procedures. As used hereinafter, the expression "substantially solid articles" means a structure substantially free from internal cavity. However, such expresison is not intended to exclude an embodiment, such as shown in FIG. 18 of the accompanying drawings, wherein there may be one or more crevices between the strips D–251 and D–252 and the pieces D–27.

I claim:
1. A substantially solid article characterized by having two substantially planar and parallel major surfaces of similar size and shape and comprising
   a flexible polymer film; and
   a plurality of not less than four elongated strips of substantially rigid material in adhering contact with said polymer film;
   each of said four strips being in adhering contact with at least two adjacent said strips;
   two of said four strips having substantially both similar and triangular cross-sections;
   and the other two of said four strips having substantially both similar and trapezoidal cross-sections;
   said polymer film having at least three substantially right angle folds extending parallel to each other so that said article is of substantially rectangular cross-section when veiwed transversely of said folds of the polymer film.
2. The article as in claim 1 wherein said polymer film completely covers at least one of the two major surfaces of said article.
3. The article as in claim 1 wherein said polymer film completely covers both major surfaces and a surface of at least one of the strips of substantially triangular cross-section.
4. An article as in claim 1 except that said elongated strips of substantially trapezoidal cross-section are separated by spaced substantially parallel flat pieces of substantially rigid material adhered to their innermost and interfacing surfaces of the first mentioned elongated strips.
5. An article as in claim 1 further having two additional elongated strips each of substantially triangular cross-section in adhering contact with said polymer film and disposed transversely and in abutting relation to the ends of the two strips of trapezoidal cross-section and being adhered thereto, whereby opposite ends of said article are covered by said polymer film.
6. An article as in claim 5 in which each of said additional elongated strips lies between and abutting said four elongated strips.

References Cited

UNITED STATES PATENTS

| | | | |
|---|---|---|---|
| 1,591,062 | 7/1926 | Smith | 156—202 |
| 1,619,011 | 3/1927 | Agar | 161—102 |
| 1,874,922 | 8/1932 | Delaney | 161—106 |
| 3,117,902 | 1/1964 | Holzheimer | 156—213 |

FOREIGN PATENTS

| | | | |
|---|---|---|---|
| 328,252 | 8/1935 | Italy | 156—216 |
| 1,137,048 | 11/1955 | France | 156—217 |

WILLARD E. HOAG, Primary Examiner

U.S. Cl. X.R.

161—44, 99, 113, 139, 145, 149; 52—309, 613, 622, 631